United States Patent [19]
Dente et al.

[11] Patent Number: 5,315,568
[45] Date of Patent: May 24, 1994

[54] APPARATUS AND METHOD FOR ACCESSING SECTORS OF A ROTATING DISK

[75] Inventors: James J. Dente; Glen A. Jaquette; William C. Williams, all of Tucson, Ariz.

[73] Assignee: International Business Machines Corporation, Armonk, N.Y.

[21] Appl. No.: 974,639

[22] Filed: Nov. 12, 1992

[51] Int. Cl.$^5$ .............................................. G11B 17/22
[52] U.S. Cl. ....................... 369/32; 369/48; 369/275.3
[58] Field of Search ............ 369/32, 13, 275.3, 275.4, 369/59, 58, 48, 50–51, 56, 54, 93, 284, 111, 44.11, 44.26, 44.27, 44.28, 44.39; 360/48, 51, 53

[56] References Cited

U.S. PATENT DOCUMENTS

| | | | |
|---|---|---|---|
| 4,118,734 | 10/1978 | Bouwhuis et al. | 358/128 |
| 4,791,622 | 12/1988 | Clay et al. | 369/59 |
| 4,796,098 | 1/1989 | Giddings | 358/342 |
| 4,873,679 | 10/1989 | Murai et al. | 369/32 |
| 4,935,917 | 1/1990 | Yoshimaru | 369/275.3 |
| 4,984,227 | 1/1991 | Yoshimaru | 369/32 |
| 5,117,412 | 5/1992 | Ito et al. | 369/109 |
| 5,153,869 | 10/1992 | Yoshimaru et al. | 369/111 |
| 5,155,714 | 10/1992 | Inoue | 369/13 |
| 5,210,733 | 5/1993 | Yamaguchi et al. | 369/48 |

FOREIGN PATENT DOCUMENTS 3205620 9/1991 Japan.
0430327 3/1992 Japan.

*Primary Examiner*—Robert J. Pascal
*Assistant Examiner*—Ali Neyzari
*Attorney, Agent, or Firm*—D. A. Shifrin

[57] ABSTRACT

Apparatus and method are provided to increase the capacity of spiral track data storage disks while improving the reliability of access to sectors on the disk. In one embodiment, employed when logical tracks on an optical disk are grouped into concentric bands, previously unusable sectors immediately following a band boundary can be reliably accessed. In accordance with this embodiment, when the target sector is, for example, the first sector of band N and a laser beam from a read head lands on a sector in the previous band N-1, the clock governing the data transfer rate is set to the frequency of the band N-1 and a sector in that band is detected and identified. Based upon the period of sectors in the band N-1, a delay interval is computed which ends when the last sector in the band N-1 rotates past the laser beam. Sector mark detection is disabled during the delay interval and the clock frequency changed to that of band N. Sector mark detection is re-enabled at the end of the delay, the band boundary passes, and the target sector can be detected and accessed. The present invention is also applicable when the target sector is not the first sector in a band as well as when the sector on which the laser beam lands is in the same band as the target sector.

32 Claims, 6 Drawing Sheets

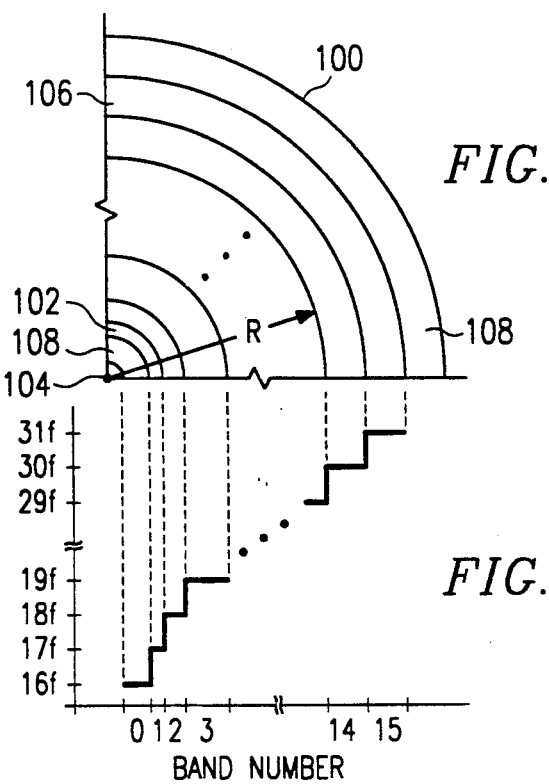
FIG. 3A
FIG. 3B
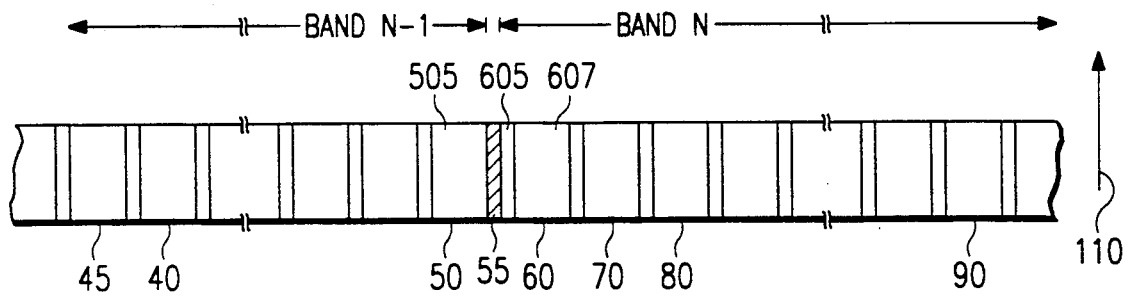
FIG. 4A
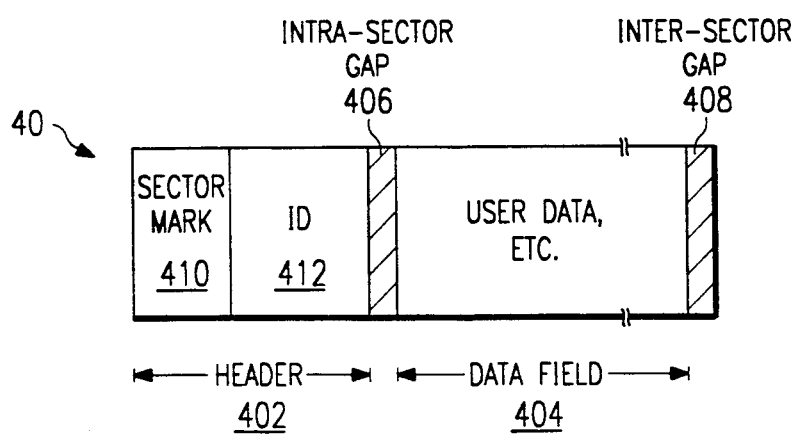
FIG. 4B

APPARATUS AND METHOD FOR ACCESSING SECTORS OF A ROTATING DISK

TECHNICAL FIELD OF THE INVENTION

The present invention relates to accessing sectors on rotating storage media, and in particular, to increasing the capacity of spiral track data storage disks, such as optical disks, while improving the reliability of access to sectors on the disk.

BACKGROUND OF THE INVENTION

A rotating recording disk, such as an optical disk, can be formatted in concentric physical tracks (each corresponding to a single disk revolution) or in a single spiral around a central spindle hole/mounting hub. The spiral is divided into a series of logical tracks (not necessarily corresponding to a single revolution); each logical track (hereinafter referred to simply as a "track") is subdivided into sectors onto which blocks of data are recorded. Each sector has a header field followed by a data field, with an intra-sector gap between the two. An inter-sector gap separates the sector from a following sector. The header is generally embossed into the surface of the disk during the manufacturing process (although the disk can be soft formatted instead) and includes a sector mark, a series of identification (ID) fields with track and sector information, and other fields to aid a read/write controller in synchronizing to the sector. The data field includes user data, associated error detection and recovery information, and synchronization information. Under one proposed standard for read only, write once and rewritable optical disk cartridges (in which an optical disk is encased in a protective housing), the header is 52 bytes long (including a five-byte, five feature sector mark pattern) and the data field is 1274 or 665 bytes long (based on 17 or 31 sectors per track, respectively, and able to record user data of 1024 or 512 bytes, respectively).

During a read or write operation, a laser beam emitted from a read/write head must be directed onto the sector to be accessed. As is known, the head is moved radially inward or outward on a carriage under servo control for the laser beam to "land" on a sector near, but ahead of, the target sector. "Near" is between about five tracks before and three sectors before the target sector. The drive controller switches to a track following mode and, using asynchronous detection, attempts to detect the first sector mark encountered by detecting laser light reflected off of a surface of the disk. A sector mark is considered detectable if at least three of the five features in the sector mark pattern are recognized. The light reflections are converted into electrical signals representative of the data recorded on the disk. If at least three features cannot be satisfactorily detected, the head attempts to read the sector mark of the following sector. Once a sector mark is satisfactorily detected, the drive controller switches to pulse position modulation (PPM) and uses a phase locked loop to lock onto the incoming identification data stream of the rest of the header and to synchronize the drive controller to the data stream. Current disk formats employ a PPM format although other formats have been proposed. The ID data is decoded into track and sector information, enabling the drive controller to determine the exact position on the disk of the laser beam.

If the sector on which the laser beam lands is not the target sector, a conventional controller reads subsequent sector marks and headers as the laser beam spirals toward the target sector. When the target sector is reached and properly identified, the user data is read from, erased from or written to the data field. To reduce false sector mark detection prior to the laser beam reaching the target sector (which could result in loss of synchronization), only sector marks detected during a window period will be treated as valid sector marks. The window is timed from the detection of a sector mark and is intended to be open from slightly before until slightly after the time the next sector mark should be detected; any false marks present outside the window will be ignored. However, if a valid sector mark is defective and not satisfactorily read (or not detected at all), the drive controller generates a pseudo-mark at the end of a window. Because the window is open for a period of time slightly longer than the time it takes for a sector mark to rotate past the laser beam (the sector's period), it can be appreciated that too many consecutive defective sector marks (resulting in a series of pseudo-marks being generated) can cause the detection window to slip and be open at the wrong time; subsequent valid marks will thereby be missed and invalid marks may be detected.

When the disk spins at a constant angular velocity (CAV), data recording and reading is highly stable and access time to a target sector is relatively fast. However, data recorded on tracks near the outer diameter of the disk will be at a lower linear density than data recorded near the inner diameter, although the amount of data recorded in a given angular rotation (angular recording density) will be the same. To increase the recording capacity of the disk, the linear density of the data should remain substantially constant by increasing the angular recording density as the radial distance from the spindle hole increases. Recording at a constant linear velocity (CLV) by decreasing the angular velocity (rotational speed) of the disk with increasing radial distance can achieve at a fixed recording frequency increased angular recording density. But, random access time to a target sector is increased due to the time required to change the rotational speed of the disk.

A method which provides the advantages of both CAV and CLV, while reducing the disadvantages of each, is to record at a modified constant angular velocity (MCAV) by increasing the data transfer rate of the drive controller with increasing radial distance. The transfer rate is a function of the frequency of the controller's clock and can be increased continually or can be increased incrementally by grouping tracks into bands and changing the clock frequency from band to band.

As an example of banded media, optical disks formatted according to the previously mentioned standard have 37,600 tracks in a user zone (located between inner and outer manufacturer and control zones near the inner and outer diameters of the disk) divided into sixteen bands of between 1600 and 3200 tracks each, the number of tracks per band increasing with increasing radial distance from the spindle hole. Relative to a base frequency "f", the clock frequency is "16f" at band zero (the innermost band), while at band fifteen (the outermost band), the clock frequency is "31f". Thus, the angular recording density will increase band by band with increasing radial distance but the linear recording density at the inner diameter of each band is constant. Moreover, the temporal position and width of the sector mark detection window timing is also a function of the band number.

Spiral, banded recording is generally preferred for high performance optical applications. If during a seek operation the laser beam lands in the same band in which the target sector is located, sector marks, ID information and user data can be detected and read without a clock frequency change. However, if the laser beam lands in one band (band N-1) and the target sector is in the next band (band N), the clock frequency must be set to $f_{N-1}$ for proper sector mark detection and to read the ID's in band N-1 and then changed to frequency $f_N$ at the boundary between bands N-1 and N for proper sector mark detection and to read the ID's and user data in band N. Because of code overhead, clock settling time and other delays, which can be approximately 500 microseconds, a certain delay is incurred after the clock frequency has changed before data can be read. A sector near the inner diameter of a disk may pass in about 1000 microseconds while a sector near the outer diameter may pass in only about 600 microseconds. Consequently, if the target is the first sector of band N and the clock frequency changes after detection of the last sector mark of the last track of band N-1, the target sector may already have passed the read head by the time the head is able to detect a sector mark. At best, target sector detection will be unreliable and, at worst, impossible. On the other hand, if the frequency is changed from $f_{N-1}$ to $f_N$ while the head is still in band N-1, the remaining sector marks and ID information in band N-1 cannot be reliably read and controller synchronization can be lost. Other combinations of target sector locations and locations of sectors on which the laser beam lands relative to band boundaries also result in reduced reliability with which sector marks can be detected and data written or read. Consequently, it has been preferred to remap, or otherwise designate as unusable or spare, certain sectors or even tracks at or near band boundaries thereby wasting valuable disk capacity and increasing access time.

SUMMARY OF THE INVENTION

In view of the foregoing, it is an object of the present invention to increase the capacity of spiral recording disks.

It is another object to improve the reliability and speed of access to data on such a disk.

It is still another object to reduce performance deficiencies associated with writing data to or reading or erasing data from a sector located at or near the beginning of a band of a storage disk.

These and other objects are achieved in the present invention by positioning a read head opposite a first sector of a recording disk, enabling sector mark detection to detect a sector mark of the first sector, disabling sector mark detection for a predetermined interval of time following the detection of the sector mark, re-enabling sector mark detection following the predetermined interval, detecting a sector mark of another sector, which is either the target sector or a sector located between the first sector and a target sector to be accessed (allowing windowed detection of the sector mark of the target sector).

When MCAV read/write is employed with banded media, the present invention enables the first sector of a band N to be accessed quickly and reliably by changing the disk controller clock frequency to that of the band N while sector mark detection is disabled and the head positioned opposite sectors in the preceding band N-1. The predetermined interval is preferably timed to end when the head is positioned opposite a data area of the last sector of the preceding band N-1. Sufficient time is thus provided for completion of code routines and for the frequency to stabilize while sector mark detection is disabled.

Consequently, the present invention improves data access reliability by disabling sector mark detection for a predetermined period of time, thereby reducing the risk of synchronization loss due to defective or missing sector marks. Moreover, when banded disks are employed, the drive controller is prepared to reliably access the target sector even before the band boundary is encountered and prohibit false synchronization to sector marks not in the target band.

The foregoing and other features and advantages of the invention will be apparent from the following more particular description of preferred embodiments of the invention, as illustrated in the accompanying drawings.

BRIEF DESCRIPTION OF THE DRAWINGS

FIG. 3A illustrates a portion of an optical disk in which logical tracks are grouped into a plurality of concentric bands;

FIG. 3B is a plot illustrating the association of clock frequencies with corresponding bands of the optical disk of FIG. 3A;

FIG. 4A illustrates the format of portions of two contiguous bands of the optical disk of FIG. 3A;

FIG. 4B illustrates the format of one sector from one band of FIG. 4A;

DETAILED DESCRIPTION OF THE INVENTION

Figure 1:
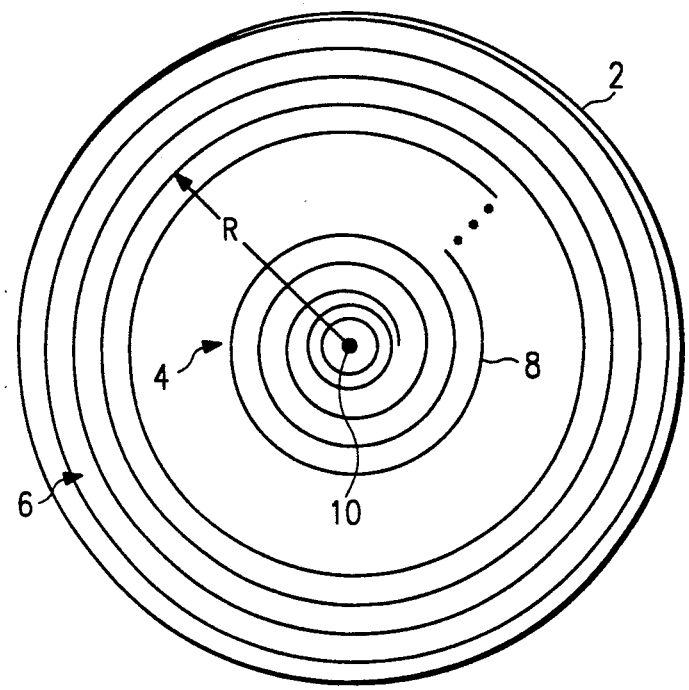
FIG. 1 illustrates an optical disk having a spiral formatted track.

FIG. 1 illustrates an optical recording disk 2 having spiral track formatting. Inner and outer portions 4 and 6 of a spiral track 8 (exaggerated) are shown around a central spindle hole/mounting hub 10. The spiral 8 is divided into a series of logical tracks, each being subdivided into sectors onto which blocks of data are recorded. As illustrated in FIG. 4B, each sector, such as a sector 40, has a header field 402 followed by a data field 404, with an intra-sector gap 406 between the two. An inter-sector gap 408 separates the sector 40 from a following sector. The header 402 includes a sector mark 410, a series of ID fields 412 with track and sector information, and other fields (not shown) to aid a controller in synchronizing to the sector 40. The data field 404 includes user data, associated error detection and recovery information, and synchronization information.

Figure 2:
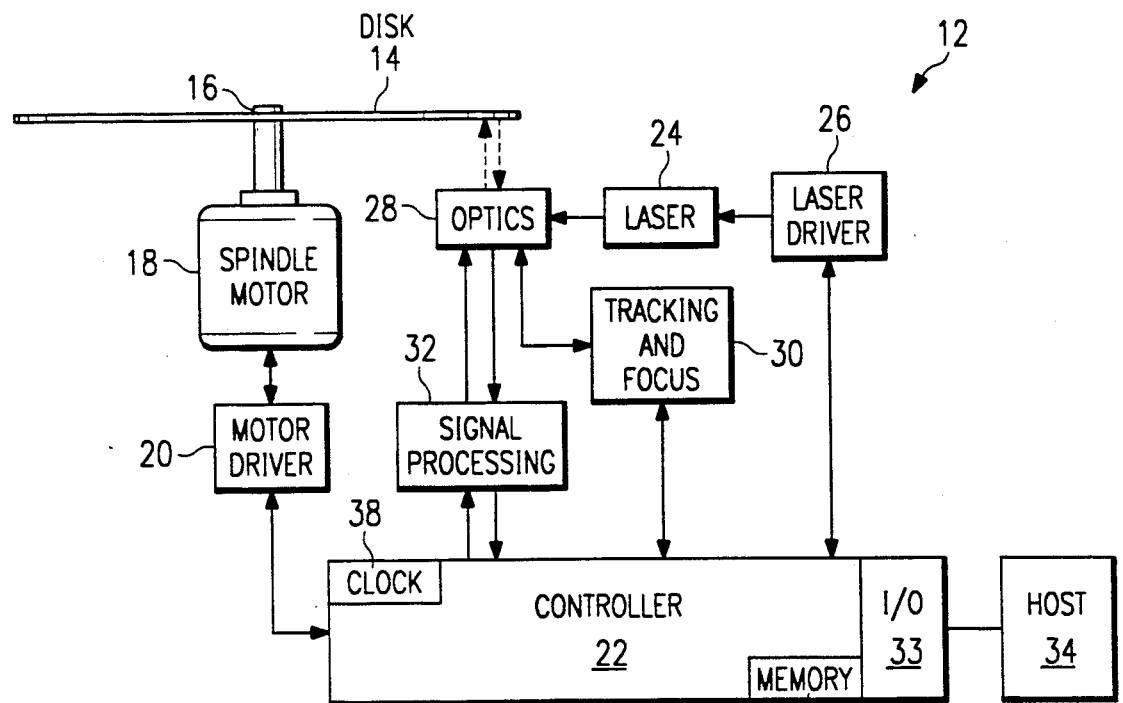
FIG. 2 is a block diagram of an optical disk subsystem of the present invention.

FIG. 2 is a block diagram of an optical drive subsystem 12 of the present invention in which an optical disk 14 is mounted on a spindle 16 connected to a motor 18. The disk 14 can be permanently mounted to the spindle 16 or can be removable; it can also be encased in a protective housing in the form of a removable cartridge. Moreover, the disk 14 can be read only (in which all of the information contained thereon has been pre-embossed), write once (in which track and sector formatting is pre-embossed and user data permanently "burned" into the disk surface as a series of pits) or erasable/rewritable (in which track and sector formatting is pre-embossed and user data recorded employing known erasable processes such as magneto-optical or phase change). The present invention is not limited to use with pre-embossed disks but is equally applicable to soft formatted disks. Additionally, the subsystem 12 can be a stand-alone subsystem or can be part of a storage library containing several such subsystems, a plurality of storage cells and a mechanical picker to manage a large number of disks.

The motor 18 is driven by a motor driver 20 which is controlled by a controller 22, such as a microprocessor. A laser beam, generated by a laser 24 driven by a laser driver 26, is projected onto a surface of the disk 14 through an optic subsystem 28 of movable prisms and lenses. The positioning of the optical elements in the subsystem 28 are controlled by various seeking, tracking and focusing servos and feedback loops 30 which are, in turn, controlled by the controller 22. When the subsystem 12 is accessing a sector or reading user data from the disk 14, laser light reflected off of the disk surface is converted into electrical signals, processed by a signal processor 32 and sent to the controller 22. The user data signals are subsequently transmitted through an interface 33 to a host processor 34.

When the subsystem 12 is writing user data to the disk 14, signals from the signal processor 32 cause modulation of the laser beam to record data onto the disk surface in a known manner. One or more memory devices 36 contain instructions and tables for the controller 22. Signals are transferred to and from the disk 14 at a rate established by a clock 38.

The present invention can be adapted for use with banded or non-banded disks having a spiral track using a constant linear density recording system. FIG. 3A illustrates a portion of an exemplary banded disk 100. The disk 100 has sixteen bands of between 1600 and 3200 logical tracks each. (These numbers are for illustrative purposes; the present invention is not restricted to any particular number of bands, tracks or sectors. Additionally, for clarity, logical tracks are not shown.) The band 102 closest to the spindle hole 104 is referred to as band zero while the band 106 farthest from the spindle hole 104 is referred to as band fifteen. Non-user inner and outer manufacturer and control zones 108 exist near the inner and outer diameters of the disk 100 but are not pertinent to the present invention. An arrow R represents the radial distance of a band from the spindle hole 104.

Under a MCAV recording system, the data transfer rate of the controller 22 is governed by the clock 38 and increases with increasing radial band distance R. FIG. 3B is a plot of the frequency of the clock 38 versus band number of the disk 100 and illustrates the step-wise progression of the frequency. Preferably, each frequency is a function of a base frequency f. A conversion or lookup table in ROM, as part of the memory 36, can store band information correlated with appropriate frequencies. It can be appreciated that frequency control must be as rigid as possible for satisfactory data transfer and that a delay interval following frequency changes must be taken into account due to code overhead, hardware settling and other factors.

FIG. 4A illustrates the format of portions of two contiguous bands N-1 and N of the optical disk 100 of FIG. 3A and FIG. 4B illustrates the format of one sector 40 of band N-1. Scanning occurs from left to right in FIGS. 4A and 4B and the radially outward direction is indicated in FIG. 4A by an arrow 110. Band and sector formats have been simplified for purposes of illustration.

Figure 5:
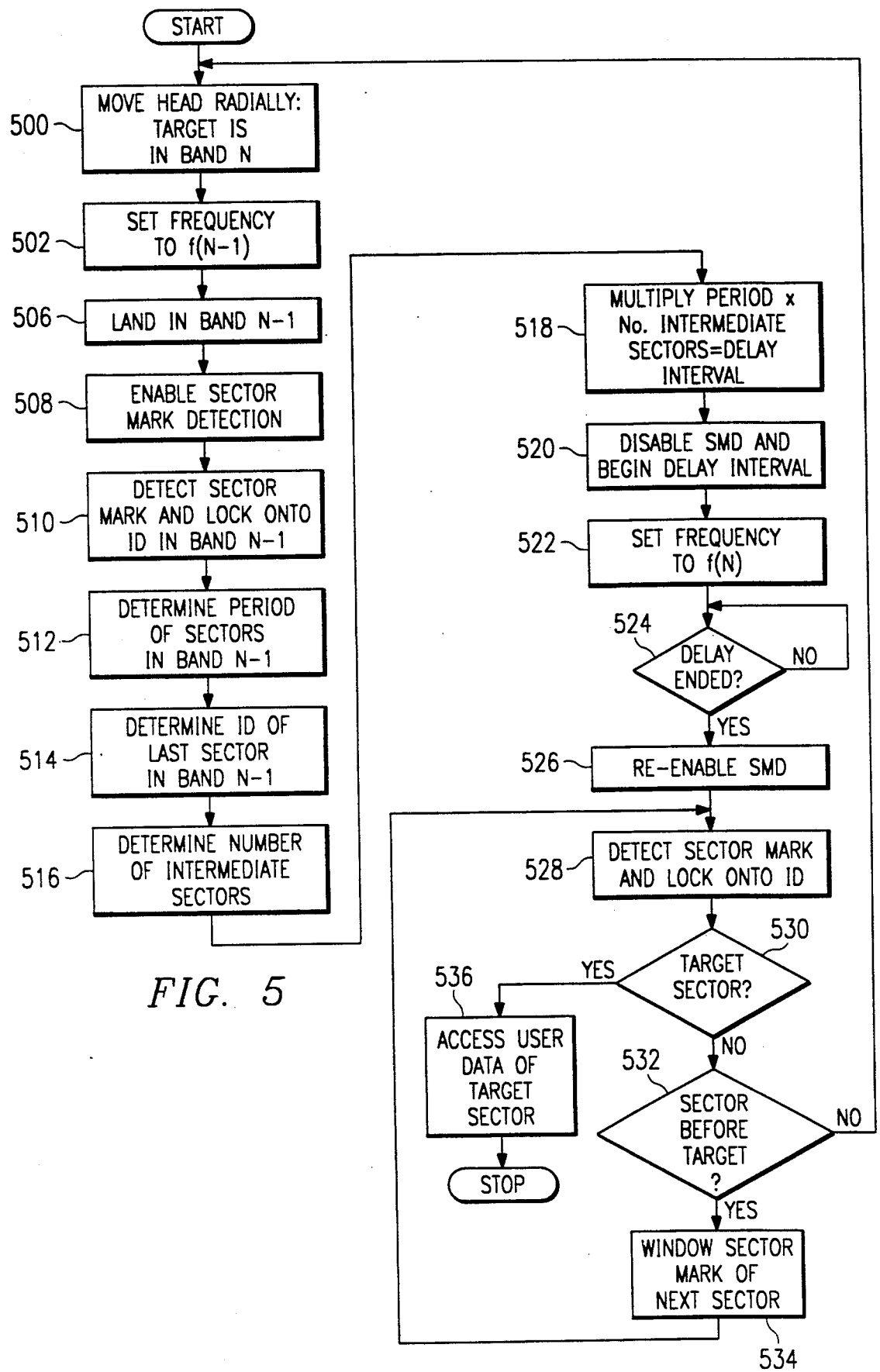
FIG. 5 is a flow chart of one embodiment of the present invention.

The operation of the present invention will now be described with reference to FIGS. 4A, 4B and 5. When a target sector to be accessed (to be read from, written to or erased) is the first sector 60 in the band N, the head is moved radially (Step 500) and the clock frequency governing the data transfer rate is set to the frequency $f_{N-1}$ of the preceding band N-1 (Step 502). The laser beam will first land on a sector, such as sector 45, in band N-1 (Step 506) no closer to the target sector 60 than three sectors and no farther away than five tracks. It will be appreciated that the seek window can have endpoints other than those suggested here. Sector mark detection is enabled (Step 508) to permit the subsystem 12 to detect the sector mark 410 of the next sector 40 and lock onto and read ID information in the ID field 412 (Step 510), thereby identifying the current location of the laser beam. The controller 22 next determines (Step 512) from information stored in its memory 36 the period of a sector in band N-1 (i.e., the length of time for a sector to rotate past the laser beam), the period being a function of the radial distance R of the band from the spindle hole 10. This information can also be in the form of a table in ROM in the memory 36 in which track and sector information (or band information) is correlated with appropriate sector periods.

The controller 22 identifies the last sector 50 in the band N-1 (Step 514) and in a software routine calculates the number of intermediate sectors between the current sector 40 and the last sector 50 (Step 516). This number is multiplied by the sector period (Step 518) to calculate a delay interval. The delay interval commences and sector mark detection is disabled (Step 520) and the clock frequency then switched (Step 522) to the frequency $f_N$ of the band N in which the target sector 60 is located. The code loops (Step 524) while the disk rotates until the delay interval has ended, giving the subsystem 12 time to stabilize at the new frequency. At the completion of the interval, the data field of the last sector 50 will have rotated to a position beneath the laser beam and sector mark detection is re-enabled (Step 526). Thus, the first sector mark detectable after sector mark detection is re-enabled is the first sector mark after the boundary between band N-1 and N. Sector mark 605 of the target sector 60 is thereby detected and the ID information read (Step 528). If the sector is not the target (Step 530), the subsystem 12 determines whether the sector is before or after the target sector 60 (Step 532). If the sector is after, the process routine returns to the beginning (to Step 500) and makes another attempt to locate the target sector 60. If the sector is before the target sector 60, the sector mark of the next sector is windowed (Step 534) to allow reliable sector mark detection and the routine returns to Step 528. When the target is finally located, the subsystem 12 gains access (Step 536) to the user area 607 of the target sector 60 and the data operation can be performed.

The present invention is adaptable to access situations in which the target sector is not the first sector in band N, in which the sector first landed on by the laser beam is at the end of band N-1, or in which the target sector and the sector first landed on are both in the same band N. If the target sector is the second or later sector in band N, such as the second sector 70, sector mark detection can be re-enabled (Step 526 of FIG. 5) when the laser beam is in the data field 505 of the last sector 50 of band N-1 (as described above with reference to FIG. 5) whereby the sector mark of the target sector 70 is the second (or greater) sector mark encountered after re-enablement. Alternatively, sector mark detection can be re-enabled when the laser beam is in the data field of the sector 60 preceding the target sector 70, whereby the sector mark of the target sector 70 is the first sector mark encountered after re-enablement. Under this alternative, because the period of a sector in band N is different from the period of a sector in band N-1, the present invention takes the difference (as well as the period of the band boundary or transition area 55) into account when calculating the delay interval by adding to the interval calculated in Step 518 the periods of those sectors in the band N which must be passed before reaching the target sector.

Figure 6:
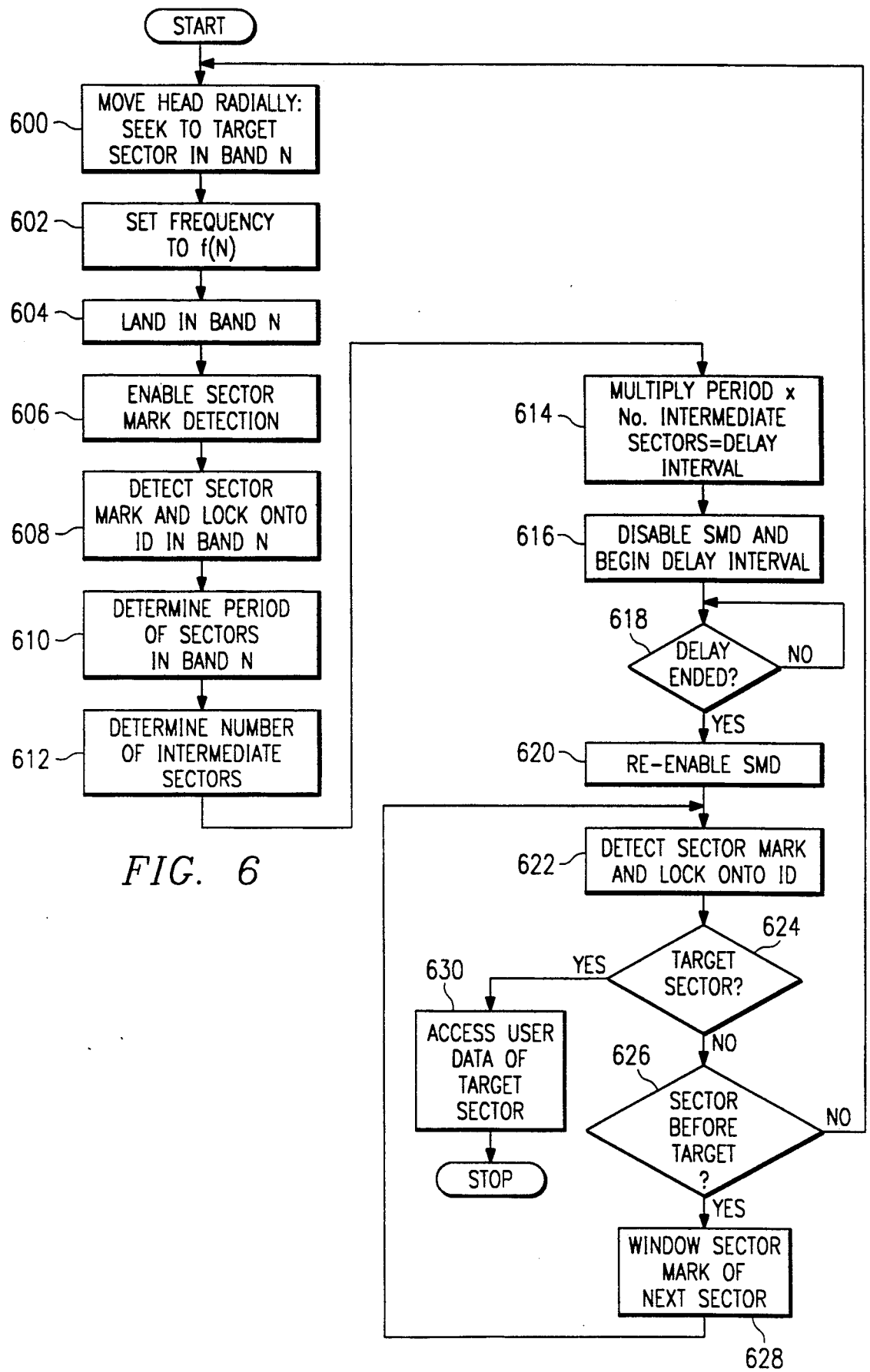
FIG. 6 is a flow chart of another embodiment of the present invention.

FIG. 6 is a flow chart of the process to be followed when the target sector, such as the sector 90 (FIG. 4A), and the sector first landed on by the laser beam, such as the sector 70, are both in the same band N. The head is moved radially (Step 600) and the clock frequency governing the data transfer rate is set to the frequency $f_N$ of band N (Step 602). The laser beam has first landed on a sector, such as sector 70, in band N (Step 604); again, the sector 70 is preferably no closer to the target sector 90 than three sectors and no farther away than five tracks. Sector mark detection is enabled (Step 606) to permit the subsystem 12 to detect the sector mark of the next sector 80 and lock onto and read ID information in the ID field (Step 608), thereby identifying the current location of the laser beam. The controller 22 next determines (Step 610) from data stored in its memory 36 the period of each sector in band N.

The controller 22 next identifies the sector preceding the target 90 and calculates the number of intermediate sectors between it and the current sector 70 (Step 612). This number is multiplied by the sector period (Step 614) to calculate a time delay. The delay interval begins and sector mark detection is disabled (Step 616) and the code then loops (Step 618) as the disk rotates until the delay period has ended. At the completion of the delay interval, the data field of the sector preceding the target 90 will have rotated to a position beneath the laser beam. Sector mark detection is then re-enabled (Step 620) and the first sector mark detectable after sector mark detection is re-enabled is the sector mark of the target sector 90. This sector mark is thereby detected and the ID information read (Step 622). If the sector is not the target (Step 624), the subsystem 12 determines whether the sector is before or after the target sector 90 (Step 626). If the sector is after, the process routine returns to the beginning (to Step 600) and makes another attempt to locate the target sector 90. If the sector is before the target sector 90, the sector mark of the next sector is windowed (Step 628) to allow reliable sector mark detection and the routine returns to Step 622. When the target, finally located, the subsystem 12 gains access (Step 630) to the user area of the target sector 90 and the data operation can be performed.

The present invention thus permits the sectors near a band boundary, including the first sector in a band, to be accessed reliably. The present invention also reduces performance degradation, including loss of synchronization, caused by one or more defective sector marks between the sector landed on by the laser beam and the target.

While the invention has been particularly shown and described with reference to preferred embodiments thereof, it will be understood by those skilled in the art that various changes in form and details may be made therein without departing from the spirit and scope of the invention.

What is claimed is:

1. A controller for positioning an optical read head opposite a target sector of a spiral track rotating optical disk having a plurality of bands, each band having a plurality of logical tracks, each track having a plurality of sectors, each sector having a sector mark area, an identification area and a user data area, the controller comprising:

a data transfer clock for regulating the rate at which data is transferred from an optical disk;

means for setting a frequency of said clock to a first frequency when an optical head is positioned opposite a sector P in a first band of the disk, the first clock frequency being a function of the radial distance from an inner disk area to the first band;

means for enabling detection of a sector mark and reading an identification in the sector P and causing said frequency setting means to set the frequency of said clock to a second frequency, the second clock frequency being a function of the radial distance from the inner disk area to a second band of which a target sector is a first sector; and means for disabling said sector mark detection means until the optical head is opposite the user data area of a last sector Q in the first band and for re-enabling said sector mark detection means whereby the sector mark of the target sector is detected.

2. The controller of claim 1, further comprising means for calculating a total interval of passage for intermediate sectors between the sector P and the sector Q.

3. The controller of claim 2, wherein said means for calculating comprises:

means for determining the number of the intermediate sectors;

means for ascertaining an individual interval of passage of an intermediate sector; and means for multiplying the ascertained individual interval of passage by the number of the intermediate sectors.

4. The controller of claim 3, further comprising memory means for maintaining information correlating an individual interval of passage with each sector.

5. An optical storage system for reading information from an optical disk having a spiral track, comprising:

a spindle motor for receiving and rotating an optical disk having a plurality of sectors on a spiral track;

an optical head for generating electrical signals from light emitted by said optical head and reflected from a surface of the disk, the signals being representative of the information recorded thereon;

means for moving said optical head to a position opposite a first sector on the disk; sector mark detection means;

means for calculating a predetermined interval from individual periods of passage for intermediate sectors between the first sector and a second sector, the second sector following the first sector and preceding a target sector; and means for enabling said sector mark detection means to permit detection of a sector mark in the first sector, for disabling said sector mark detection means for a predetermined interval, and for re-enabling said sector mark detection means to permit detection of a sector mark of the second sector.

6. The system of claim 5, wherein said means for calculating comprises:
means for determining the number of the intermediate sectors;
means for ascertaining individual intervals of passage of the intermediate sectors; and
means for summing the individual intervals of passage.

7. The system of claim 6, further comprising memory means for maintaining information correlating an individual interval of passage with each sector.

8. The system of claim 5, wherein said sector mark detection means comprises means for detecting the sector mark of the target sector after said sector mark detection means is re-enabled.

9. The system of claim 8, wherein said optical head comprises means for reading user data from the target sector.

10. The system of claim 8, wherein said optical head comprises means for writing user data to the target sector.

11. The system of claim 8, wherein said optical head comprises means for erasing user data from the target sector.

12. The system of claim 5, wherein the disk is formatted with a plurality of bands, each band having a band number and comprising a plurality of logical tracks, each logical track comprising a plurality of sectors,
the system further comprising a data transfer clock and means, responsive to a position of said optical head, for changing a frequency of said clock whereby the clock frequency is a function of the band number of the band opposite which said optical head is positioned.

13. The system of claim 12 wherein:
the first sector is located in a first band and the target sector is located in a second band, immediately following the first band; and
said frequency changing means comprises means for setting the clock frequency to a first frequency, being a function of the band number of the first band, while said moving means is moving said optical head to the position opposite the first sector and for setting the clock frequency to a second frequency, being a function of the band number of the second band, after said disabling means has disabled said sector mark detection means.

14. The system of claim 13, wherein the second sector is the last sector in the first band and the target sector is the first sector in the second band.

15. The system of claim 13, wherein the second sector is the last sector in the first band and the target sector is at least the second sector in the second band.

16. A method for reading information from a target sector on a spiral track rotatable recording disk, comprising the machine-executable steps of:
positioning a read head opposite a first sector of a rotating disk having a sector mark and identification information recorded thereon;
enabling sector mark detection;
detecting a sector mark of the first sector;
reading an identification of the first sector;
disabling sector mark detection for a predetermined interval following detection of the sector mark of the first sector;
re-enabling sector mark detection following the predetermined interval;
calculating a total interval of passage for intermediate sectors between the first sector P and a second sector following the first sector and preceding a target sector;
detecting a sector mark of the second sector; and
detecting a sector mark of the target sector.

17. The method of claim 16 wherein said calculating step comprises the machine-executable steps of:
determining the number of the intermediate sectors;
ascertaining individual intervals of passage of the intermediate sectors; and
summing the ascertained individual intervals of passage.

18. The method of claim 17, wherein said ascertaining step comprises the machine-executable step of reading individual intervals of passage from a memory device.

19. The method of claim 16, further comprising the machine-executable step of reading user data from the target sector following the step of detecting the sector mark of the target sector.

20. The method of claim 16, further comprising the machine-executable step of writing user data to the target sector following the step of detecting the sector mark of the target sector.

21. The method of claim 16, further comprising the machine-executable step of erasing user data from the target sector following the step of detecting the sector mark of the target sector.

22. The method of claim 16, wherein the recording disk comprises a plurality of bands, each band comprising a plurality of logical tracks, each track comprising a plurality of sectors.

23. The method of claim 22, wherein the first sector and the target sector are located in the same band.

24. The method of claim 22, wherein the first sector is located in a first band and the target sector is located in a second band, immediately following the first band.

25. The method of claim 24, further comprising the machine-executable steps of:
setting a data transfer clock to a first frequency, proportional to the radial distance from an inner area of the disk to the first band, during said head moving step; and
setting the data transfer clock to a second frequency, proportional to the radial distance from the inner area of the disk to the second band, after said sector mark detection disabling step.

26. The method of claim 25, wherein the target sector is the first sector of the second band.

27. The method of claim 26, wherein the second sector is the last sector of the first band and the interval of passage ends when the read head is located opposite a data field of the second sector.

28. The method of claim 25, wherein the target sector is the second sector of the second band.

29. The method of claim 28, wherein the second sector is the first sector of the second band and the interval of passage ends when the read head is located opposite a data field of the first sector of the second band.

30. The method of claim 25, wherein the target sector is at least the third sector of the second band.

31. The method of claim 30, wherein the second sector is the last sector of the first band and the interval of passage ends when the read head is located opposite a data field of the last sector of the first band.

32. The method of claim 16, wherein the recording disk is an optical disk.

* * * * *